United States Patent
Kim et al.

(10) Patent No.: US 6,344,625 B1
(45) Date of Patent: Feb. 5, 2002

(54) METHOD AND APPARATUS FOR MONITORING THE SIZE VARIATION AND THE FOCUS SHIFT OF A WELD POOL IN LASER WELDING

(75) Inventors: Cheol-Jung Kim; Sung-Hoon Baik; Min-Suk Kim; Chin-Man Chung, all of Daejeon-si (KR)

(73) Assignee: Korea Atomic Energy Research Institute, Daejeon-Si (KR)

( * ) Notice: Subject to any disclaimer, the term of this patent is extended or adjusted under 35 U.S.C. 154(b) by 0 days.

(21) Appl. No.: 09/589,134

(22) Filed: Jun. 8, 2000

(30) Foreign Application Priority Data

May 30, 2000 (KR) .................................... 2000-0029230

(51) Int. Cl.⁷ ............................................. B23K 26/20
(52) U.S. Cl. .............................. 219/121.62; 219/121.63
(58) Field of Search ........................ 219/121.6, 121.61, 219/121.62, 121.63, 121.65, 121.83

(56) References Cited

U.S. PATENT DOCUMENTS

| | | | | |
|---|---|---|---|---|
| 4,446,354 A | * | 5/1984 | Kearney ................. | 219/130.01 |
| 5,155,329 A | * | 10/1992 | Terada et al. ........... | 219/121.63 |
| 5,272,312 A | * | 12/1993 | Jurca ...................... | 219/121.63 |
| 5,607,605 A | * | 3/1997 | Musasa et al. .......... | 219/121.63 |

OTHER PUBLICATIONS

F.M. Haran, et al. "Real–time Focus Control in Laser Welding," Measurement Science and Technology, vol. 7, pp. 1095–1098 (1996).
Cheol–Jung Kim, et al. "Size Variation Monitoring of a Weld Pool in Pulsed Laser Welding by Chromatic Filtering," Optics Communication, vol. 152, pp. 239–242.
Cheol–Jung Kim, et al. "Size Variation Monitoring of an Weld Pool in Pulsed Laser Welding by Chromatic Filtering," The Review of Laser Engineering, Laser Society of Japan, vol. 26, pp. 86–89.

* cited by examiner

Primary Examiner—Samuel M. Heinrich
(74) Attorney, Agent, or Firm—Arent Fox Kintner Plotkin & Kahn, PLLC

(57) ABSTRACT

In a laser welding, a laser beam is focused on a workpiece by a focusing lens or lenses. The focusing lens or lenses image an aperture liming the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool radiates a thermal radiation. An apparatus and method is disclosed wherein the thermal radiation is measured back through the focusing lens or lenses and through the aperture limiting the size of the laser beam or any other aperture limiting a size of the thermal radiation to be measured in at least three spectral bands with single element detectors. Due to the chromatic aberration of the focusing lens or lenses, the transmittance of each spectral band of the thermal radiation varies with the size variation and with the focus position of a weld pool and the spectral band signals measured with single-element detectors vary if the size and/or the focus position of a weld pool varies. Algorithm to monitor the size variation and/or the focus position of a weld pool is disclosed wherein the size variation of a weld pool is monitored independently from the focus shift of the focusing lens or lenses and the focus position of a weld pool is monitored independently from the power variation of the laser.

24 Claims, 12 Drawing Sheets

METHOD AND APPARATUS FOR MONITORING THE SIZE VARIATION AND THE FOCUS SHIFT OF A WELD POOL IN LASER WELDING

BACKGROUND OF THE INVENTION

1. Field of the Invention

The present invention relates in general to weld process monitoring techniques, and more particularly to improved methods and apparatus for real-time monitoring of thermal radiation of a weld pool to monitor a size variation and a focus shift of the weld pool for weld process control, utilizing the chromatic aberration of focusing lens or lenses.

2. Description of the Prior Art

The application of high power Nd:YAG lasers for precision welding in industry has been growing quite fast these days in diverse areas such as the automobile, the electronics and the aerospace industries. Nowadays, a Nd:YAG laser with as much as 6 kW of average power is available in the market and the fiber delivery of it makes it useful for many remote applications. On the other hand, these diverse applications also require the new developments for the precise control and the reliable process monitoring. Due to the hostile environment in laser welding, a remote monitoring is required and many acoustic and optical remote monitoring techniques have been developed. However, acoustic monitoring is not suitable for the application in a factory due to the acoustic interference from environmental noise. Therefore, optical monitoring is preferred in industrial applications.

In a laser welding, a laser beam is focused on a workpiece by a focusing lens or lenses. The focusing lens or lenses image an aperture liming the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool radiates a thermal radiation. Many optical monitoring apparatuses and methods have been developed measuring the thermal radiation from a weld pool.

As to the optical monitoring, two approaches have been followed: one monitors the image of a weld pool with a CCD or an infrared camera and the other monitors the thermal radiation from a weld pool with one or more single-element detectors. The monitoring of image requires the fast data processing and is quite complicated and expensive to be implemented. Furthermore, the monitoring of image is not applicable to a laser welding with a laser delivery fiber because the image of a weld pool can not be transmitted through a single-core laser delivery fiber. On the other hand, the monitoring of thermal radiation is simple and cheap to be implemented, and fast and robust for industrial applications. However, the information on a weld pool status in the thermal radiation monitoring is limited compared to the image monitoring. Therefore, several spectral bands of thermal radiation from ultraviolet to infrared have been monitored with a plurality of detectors to widen the information on a weld pool status. Examples of such method or apparatus for weld monitoring can be found in U.S. Pat. Nos. 4,446,354, 5,155,329, 5,272,312, 5,360,960, 5,506,386, 5,651,903, 5,674,415, 5,681,490 and 5,728,992.

However, these methods or apparatuses could provide some information on the change in the status of a weld pool, but could not provide the information on the focus shift of a focusing lens or lenses to maintain a uniform laser welding. On the other hand, chromatic aberration of a lens or lenses has been used in the focus control of a lens or lenses as shown in U.S. Pat. No. 4,992,859 and has also been used in the distance measurement or in the distance control as shown in U.S. Pat. No. 5,785,651 or in U.S. Pat. No. 5,218,193. In the monitoring of a laser welding, U.S. Pat. No. 5,850,068 could provide the information on the focus shift of a focusing lens or lenses using the chromatic aberration of the focusing lens or lenses by subtracting one spectral band signal from the other spectral band signal. However, U.S. Pat. No. 5,850,068 could not provide the information on the size variation of a weld pool. Furthermore, the information on the focus shift of a focusing lens or lenses provided by U.S. Pat. No. 5,850,068 would be incorrect if the power of a laser is varied because the subtraction of one spectral band signal from the other spectral band signal is doubled if the thermal radiation intensity is doubled by the increase of laser power even if the focus position of a focusing lens or lenses is not shifted. The information on the focus shift of a focusing lens or lenses provided by U.S. Pat. No. 5,850,068 would also be incorrect if the size of a weld pool is varied during a laser welding because the focus position of the highest intensity of each spectral band signal shifts as the size of a weld pool varies and the error signal changes even if the focus position of a focusing lens or lenses is not shifted.

The variation of a laser power can be easily monitored at the laser unit itself, but it is not easy to monitor the variation of a laser power at a workpiece due to the absorption by mirrors or lenses in the path of laser delivery. Therefore, a focus shift monitoring independent of the size variation of a weld pool is required for industrial laser welding applications.

As to the image monitoring of a weld pool using a CCD or an infrared camera, the size of a weld pool provides important information on the status of a weld pool. It can provide the information on the change of a laser power at a workpiece and also the information on the weld depth. If a variation of weld pool size is measured, the variation of weld pool size can be compensated by adjusting the laser power. However, the size of a weld pool measured with a CCD or an infrared camera depends on the focus shift of a workpiece. If the focus position of a workpiece is shifted during a laser welding, the size of a weld pool measured with a CCD or an infrared camera varies and the information on the status of a weld pool becomes incorrect. Therefore, a size monitoring of a weld pool independent of the focus shift of a workpiece is required for industrial laser welding applications.

U.S. Pat. No. 5,875,026, Korean Pat. No. 0193,276 and Japanese Pat. 2,895,021 disclosed a method and an apparatus measuring the size variation and the focus shift of an extended radiation source using the chromatic filtering wherein the chromatic aberration of imaging optics is used to provide the information on the size variation and the focus shift of an extended radiation source by measuring spectral band signals of thermal radiation through the imaging optics and through an aperture. The variations of the transmittances of the spectral band signals through the imaging optics and through the aperture are used in providing the information on the size variation and the focus shift of an extended radiation source.

U.S. patent application Ser. No. 09/190,234 used the chromatic filtering disclosed in U.S. Pat. No. 5,875,026, Korean Pat. No. 0193276 and Japanese Pat. 2895021 to provide the size variation and the focus shift of a weld pool in a pulsed laser welding wherein the size of a weld pool could be reduced between the laser pulses due to the thermal conduction cooling through a workpiece. In U.S. patent application Ser. No. 09/190,234, an algorithm was disclosed wherein a function obtained from the transmittances of the spectral bands for the size measurement of a weld pool provided a reference size which is usually the same as the size of a focused laser beam so that the size of a weld pool could be measured from the reference size by comparing a value obtained from the processed spectral band signals with another value of the function obtained from the transmittances of the spectral bands for the size measurement and another algorithm was disclosed wherein another function obtained from the transmittances of the spectral bands for the focus shift measurement of a weld pool provided the information on the focus shift of a weld pool by comparing a value obtained from the processed spectral band signals with another value obtained from another function obtained from the transmittances of the spectral bands for the focus shift measurement. In U.S. patent application Ser. No. 09/190,234, the wavelengths of spectral bands and the timings to measure the spectral band signals were optimized to measure the size variation of a weld pool independently from the focus shift of a weld pool and to measure the focus shift of a weld pool independently from the size variation of a weld pool. These features were possible because in a pulsed laser welding the size of a weld pool is reduced between the laser pulses due to the thermal conduction cooling through the workpiece. However, in a continuous laser welding, the size of a weld pool is generally larger than the size of a focused laser beam and does not vary except at the beginning of a laser welding. Therefore, the algorithms and the optimization in the selection of the wavelengths of spectral bands in U.S. patent application Ser. No. 09/190,234 could not be applied in a continuous laser welding.

SUMMARY OF THE INVENTION

Hence, it is the fundamental object of the present invention to provide a method and an apparatus whereby an independent monitoring of the size variation and/or the focus shift of a weld pool in a continuous laser welding can be obtained in a manner which is simple and suitable for industrial applications. It is another object of the present invention to provide a method and an apparatus wherein a uniform laser welding is obtained by compensating the size variation with a laser power control and by controlling the position of a weld pool in focus position.

These objects are satisfied by utilizing the chromatic filtering of the thermal radiation of a weld pool. A method and an apparatus for monitoring the size variation and the focus shift of a weld pool are provided for a continuous laser welding wherein the size variation of a weld pool is monitored independently from the focus shift of a weld pool and the focus shift of a weld pool is monitored independently from the size variation of a weld pool. In a laser welding, a weld pool is generated on a workpiece by transmitting a laser beam through an aperture which limits a size of a laser beam and focusing transmitted laser beam with at least one lens with some chromatic aberration but minimum spherical aberration on a workpiece. The thermal radiation from a weld pool is measured at at least three spectral bands through at least one focusing lens and through the aperture which limits a size of a laser beam or through any other aperture which limits a size of a weld pool wherein the thermal radiation is measured with single-element detectors after the thermal radiation is separated from the reflected laser beam with a dichromatic mirror, after splitting the spectral bands of the thermal radiation with dichromatic mirrors and beam splitters and after filtering each spectral band with a narrow band-pass optical filter. A distal end of an optical fiber can be used as an aperture for a laser deliverable through an optical fiber.

In a laser welding, a laser beam is focused on a workpiece by a focusing lens or lenses. The focusing lens or lenses image an aperture limiting the size of the laser beam on the workpiece and the size of focused laser beam is the image size of the aperture on the workpiece at the wavelength of the laser. A weld pool is generated by the interaction of the focused laser beam and the workpiece. Due to the thermal conduction of the workpiece, the size of the weld pool is generally not the same as the size of the focused laser beam and varies with the power of the laser or with the focus shift of the focusing lens or lenses. The weld pool radiates a thermal radiation according to the blackbody radiation law and the spectral dependence of the thermal radiation can be estimated. Due to the chromatic aberration of the focusing lens or lenses, the transmittance of each spectral band of the thermal radiation varies with the size variation and with the focus position of a weld pool and the spectral band signals measured with single-element detectors vary if the size and/or the focus position of a weld pool varies. The transmittance of a thermal radiation on a weld pool through focusing lens or lenses and through an aperture can be calculated as a function of position on the weld pool at each spectral band on a basis of optical design parameters of the focusing lens or lenses and the aperture for a plurality of focus shifted positions of the weld pool. Furthermore, the spectral band signals follow the blackbody radiation law so that the dependence of the spectral band signals on the size variation and the focus shift of a weld pool can be estimated using the transmittance functions of the spectral bands.

For a size variation monitoring, the wavelength weighted spectral band signals, one in the shorter wavelength than the laser wavelength, another in the longer wavelength and the other near the laser wavelength, are used wherein the focus shift dependence of the size variation monitoring obtained from the two spectral band signals, one near the laser wavelength and the other in the shorter wavelength, is compensated by the focus shift dependence of the size variation monitoring obtained from the two spectral band signals, one near the laser wavelength and the other in the longer wavelength, but the sensitivity of the size variation monitoring is enhanced by optimizing the wavelengths of the spectral bands so that the size variation monitoring becomes independent from the focus shift of a weld pool. On the other hand, for a focus shift monitoring, the ratio of two spectral band signals, one in the shorter wavelength than the laser wavelength and the other in the longer wavelength than the laser wavelength, is used wherein the transmittance functions of the two spectral bands are as same as possible so that the focus shift monitoring becomes independent from the size variation of a weld pool. The algorithms developed in the present invention for monitoring the size variation and the focus shift of a weld pool in a continuous laser welding can also be applied to a pulsed laser welding if the spectral band signals are measured during a laser pulse.

In conclusion, the monitoring of the size variation and the focus shift of a weld pool is achieved with a plurality of single-element detectors by utilizing the chromatic filtering of the thermal radiation from a weld pool. The use of a plurality of single-element detectors rather than a CCD or an infrared camera makes it very fast to process the data and cheap to be implemented for industrial applications. The monitoring of weld pool size variation can also be used to monitor the weld depth in a laser welding. Furthermore, the monitoring of the size variation of a weld pool is independent from the focus shift of a weld pool and the monitoring of the focus shift of a weld pool is independent from the size variation of a weld pool. In other words, the simultaneous monitoring of the size variation and the focus shift is achieved.

These and other features, aspects and advantages of the present invention will become better understood with preference to the following description and appended claims.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENT

Embodiments of the present invention will now be described in greater detail for a laser welding with 1.06 um Nd:YAG laser with reference to more specific drawings and data, which are for a better understanding of the invention and not for limiting purposes.

Figure 1:
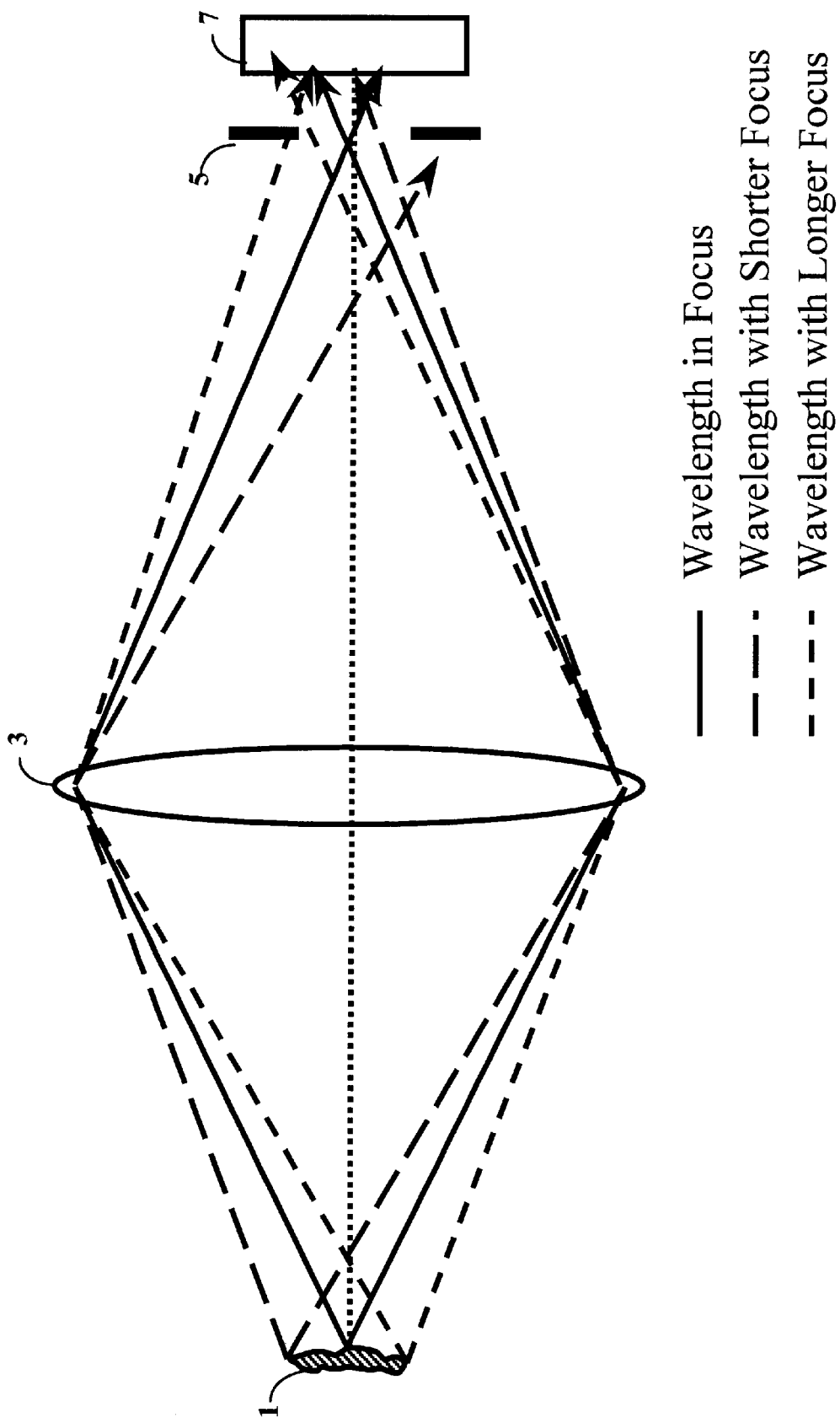
FIG. 1 illustrates the principle of chromatic filtering.

FIG. 1 illustrates the principle of chromatic filtering wherein a thermal radiation from a weld pool 1 is measured through a focusing lens 3 or lenses and through an aperture 5 with detecting unit 7 comprising single element detectors at a plurality of spectral bands. The spectral band signals vary with the focus shift of the weld pool 1 and/or with the size variation of the weld pool 1. The variations of the spectral band signals can be calculated because the chromatic aberration of the focusing lens or lenses is known and the weld pool generates the thermal radiation according to the blackbody radiation law. Therefore, the processed spectral band signals can be used in the monitoring of the size variation and the focus shift of a weld pool 1 by comparing the processed spectral band signals with the calculated values obtained from the transmittance functions of the spectral bands.

Figure 2:
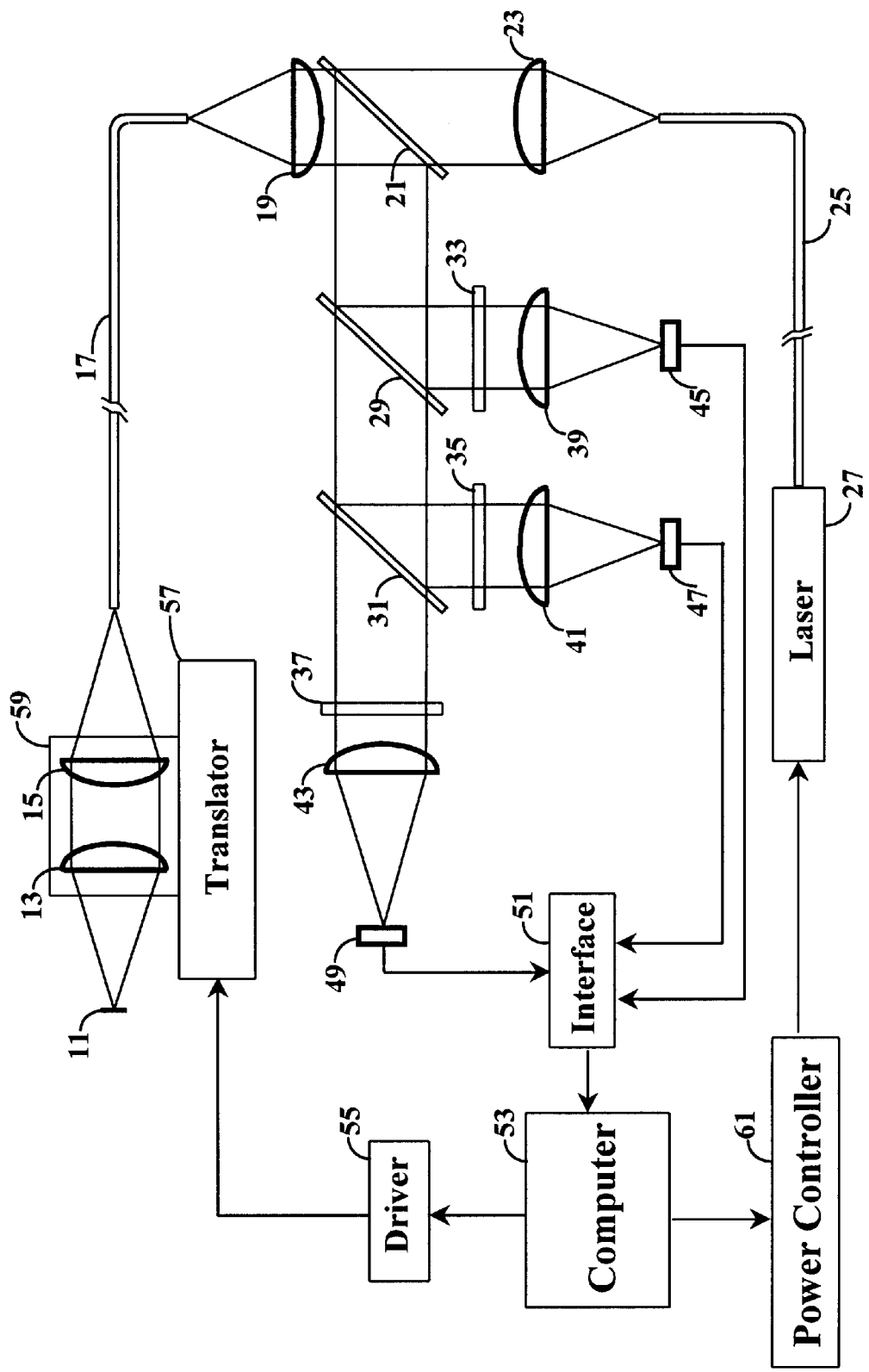
FIG. 2 is a schematic representation of a system for chromatic filtering of thermal radiation from a weld pool in accordance with the present invention.

FIG. 2 illustrates a schematic representation of a system for chromatic filtering of thermal radiation from a weld pool in accordance with the present invention. A weld pool 11 is generated by focusing a laser beam delivered from a laser 27, directly to a dichromatic mirror 21 or through a fiber 25 and a collimating lens 23, with focusing lenses 13 and 15 after being transmitted through a fiber 17 wherein the clear aperture of core glass at the distal end of the fiber 17 acts as an aperture. The thermal radiation from a weld pool 11 is imaged on said aperture by the focusing lenses 13 and 15 and delivered through the fiber 17. Then, the thermal radiation is collimated by a lens 19 and is reflected by a dichromatic mirror 21 which transmits the laser beam but reflects the thermal radiation for chromatic filtering. The dichromatic mirror 21 shown in FIG. 2 is reflecting the thermal radiation to be measured, but transmitting the 1.06 um Nd:YAG laser. However, a dichromatic mirror which reflects the 1.06 um Nd:YAG laser, but transmits the thermal radiation to be measured can also be used as a dichromatic mirror to separate the laser and the thermal radiation.

The reflected thermal radiation is divided into three spectral bands with a dichromatic beam splitter 29 which reflects one spectral band but transmits the other two spectral bands. The reflected spectral band is filtered with a band-pass filter 33 with the bandwidth of about one hundredth to about one tenth of the laser wavelength, and focused by a lens 39 on a single-element photodiode detector 45. The transmitted two spectral bands are divided with a dichromatic beam splitter 31 which reflects one spectral band of the transmitted two spectral bands but transmits the other spectral band of the transmitted two spectral bands. The spectral band transmitted by the dichromatic beam splitter 31 is also filtered with a band-pass filter 37 with the bandwidth of about one hundredth to about one tenth of the laser wavelength, and focused by a lens 43 on a single-element photodiode detector 49. The spectral band reflected by the dichromatic beam splitter 31 is also filtered with a band-pass filter 35 with the bandwidth of about one hundredth to about one tenth of the laser wavelength, and focused by a lens 41 on a single-element photodiode detector 47. If the bandwidths of the band-pass filers 33, 35 and 37 become too narrow, the detector signals become too small to be detected with single-element photodiode detectors. However, if the bandwidths of the band-pass filers 33, 35 and 37 become too wide, the chromatic filtering becomes blurred and the chromatic filtering loses the accuracy. The detector outputs from the three detectors 45,47 and 49 are connected to a processing computer 53 through an interface 51. The process computer 53 controls the position of a translator 57 through a driver 55, and also controls the output power of the laser 27 through a power controller 61. The interface 51 samples the detector signals of all three spectral bands digitally. The digitization resolution should be higher than 8 bits to maintain the accuracy of the digitized data in processing. However, if it is higher than 16 bits, the data processing speed will become slow. The 12 to 16 bits of digitization resolution is good enough to maintain the accuracy and keep the fast data processing speed. The sampling rate should also be high enough to monitor the size variation for weld process control and control the focus shift for precision welding. It is required that the sampling interval should be less than 100 msec for the weld process control. The time interval of between 5 msec to 50 msec is preferred. Finally, the interface 51 should be able to adjust the sampling interval. The processing computer 53 should store the digitized spectral band signals, process the digitized spectral band signals and analyze the processed signals between the sampling interval for monitoring the size variation and the focus shift of a weld pool 11 in a laser welding. Furthermore, the processing computer 53 displays a size error signal related to the size variation of a weld pool in real-time for the monitoring of power variation on a workpiece, produces a size error alarm when a size error signal related to the amount of size variation escapes from the predetermined allowable range to adjust the power of a laser using the size error signal for uniform laser welding, displays a focus error signal related to the amount of focus shift in real-time for the monitoring of the focus shift, and produces a focus error alarm when the focus error signal related to the amount of focus shift escapes from the predetermined allowable range to adjust the position of the focusing lens or lenses for the correction of the focus shift error using the focus error signal.

Before going further into the detail, we have to be more specific on what is meant by the simultaneous monitoring of the size variation and the focus shift of a weld pool. Any kind of focus shift monitoring is affected by the size variation of a weld pool if the size variation is large enough and vice versa. Therefore, the size variation of a weld pool should be monitored together with the focus shift of a weld pool for industrial laser welding applications. The size of a weld pool is varied mostly by the variation of laser power on a workpiece. On the other hand, we can determine an allowable depth variation in a laser welding from the welding specifications. For example, it can be one tenth or two tenths of the required weld depth. This allowable depth variation can define the allowable size variation which induces the same amount of depth variation and the allowable focus shift in the same way. Furthermore, we can determine the minimum detectable size variation wherein no focus shift is introduced and the minimum detectable focus shift in the same way. For the industrial laser welding applications, an allowable focus control range is defined as the focus control range so that the position of a weld pool is maintained within the allowable focus shift. The allowable focus control range is preferred to be the same as the allowable focus shift, but can be less than the allowable focus shift because once the focus of a weld pool is positioned in focus at the beginning of a laser welding the focus control by the present invention keeps the focus of a weld pool within the allowable focus shift by controlling the focus position within the allowable focus control range for the dependable and reliable focus control. The allowable focus control range is only need to be large enough to locate a position of a weld pool within the allowable focus control range at the beginning of a laser welding. However, the focus shift at the maximum of the allowable focus control range can affect the size variation monitoring and induce some error in the size variation monitoring. The sum of this induced size error and the minimum detectable size variation should be smaller than the allowable size variation for a reliable size variation monitoring. In the same way, the sum of the focus error induced at the allowable size variation and the minimum detectable focus shift should be smaller than the allowable focus control range, then the focus shift less than the allowable focus control range can be monitored even if the weld pool size varies within the allowable size variation without any compensation for the size variation. This criterion is simple, but it can not be obtained easily in reality. The focus shift monitoring should be optimized to minimize the induced error from the size variation and vice versa. Then, the size variation of a weld pool can be monitored independently from the focus shift and vice versa. This is what is meant by the simultaneous monitoring of the size variation and the focus shift of a weld pool in a laser welding.

In a laser welding, a weld pool is generated on a workpiece by a focused laser beam delivered through a focusing lens or lenses and through an aperture which limits a size of the laser beam. Then, the detector signal of each spectral band measured with a single-element detector is the integration of the multiplication of the emission intensity from each point source of a weld pool at the wavelength of said spectral band and the transmittance of said wavelength at the position of said point source over the field of view of said single-element detector at said wavelength. Therefore, if the detector signals of different spectral bands are separated by dichromatic beam splitters and band-pass filters, the variations in the field of view between the different spectral bands can provide some information on the size variation of a weld pool. Furthermore, the transmittance at the wavelength of each spectral band also depends on the focus shift of said workpiece and the variation in said transmittance by the focus shift can be used for the monitoring of the focus shift of a workpiece.

To be more quantitative, a weld pool can be approximated as a uniform thermal radiation source at temperature T $°$ K. It is well known in the art that the Planck's blackbody radiation equation can be approximated by the Wien's law if the multiplication of the wavelength of a spectral band in microns and the temperature of a radiation source in $°$ K., $\lambda T$, is much smaller than 14380 um$°$ K. In laser welding, the temperature of a weld pool is near 2000$°$ K. and the Wien's law can be applicable from the visible range to the near infrared range up to 1500 nm. A Silicon photodiode has a high sensitivity in the visible range and up to 1000 nm and an InGaAs photodiode has a high sensitivity from 1000 nm and up to 1700 nm. Therefore, a Silicone photodiode is preferred in the visible range and in the near infrared up to 1000 nm and an InGaAs photodiode is preferred in the near infrared range from 1000 nm to 1700 nm.

If a thermal radiation is measured at one wavelength $W_1$ quite near to the laser wavelength to have the same chromatic aberration as the laser wavelength but quite far from the laser wavelength to be separated from the laser by a dichromatic mirror and an optical band-pass filter during a laser welding and at the other wavelength $W_2$ quite far from $W_1$ to introduce a large chromatic aberration on a focusing lens or lenses with some chromatic aberration but minimum spherical aberration because the blurring due to the spherical aberration degrades the accuracy of the chromatic filtering, the signal of a spectral band measured at a detector can be described as shown below. The wavelength $W_1$ is preferably within about one tenth and up to about two tenths of the laser wavelength. A focusing lens or lenses made of high index of refraction glass are preferred to introduce large chromatic aberration and to minimize the spherical aberration.

The signal of a spectral band at wavelength $W_1$ becomes $$X = C_1 \text{Exp}\left(\frac{-14380}{W_1 T}\right) \int_0^{r_0} t_1 r dr \quad (1)$$

$$= C_1 \text{Exp}\left(\frac{-14380}{W_1 T}\right) F(W_1, r_0)$$

where $C_1$ is a constant, T is the temperature of a weld pool in ° K., $W_1$ is the wavelength in microns and $t_1$ is the transmittance function at wavelength $W_1$ and $r_0$ is the radius of a weld pool.

Likewise, the signal of a spectral band at wavelength $W_2$ becomes $$Y = C_2 \text{Exp}\left(\frac{-14380}{W_2 T}\right) \int_0^{r_0} t_2 r dr \quad (2)$$

$$= C_2 \text{Exp}\left(\frac{-14380}{W_2 T}\right) F(W_2, r_0)$$

where $C_2$ is a constant, T is the temperature of weld pool in ° K., $W_2$ is the wavelength in microns, $t_2$ is the transmittance function at wavelength $W_2$ and $r_0$ is the radius of a weld pool.

If the spectral band signals X,Y and X',Y' are measured with some time interval, the ratios of the spectral band signals expressed in natural logarithm are $$\ln(X/X') = \frac{14380}{W_1}\left(\frac{1}{T'} - \frac{1}{T}\right) + \ln(F(W_1, r_0)) - \ln(F(W_1, r_0')) \quad (3)$$

$$\ln(Y/Y') = \frac{14380}{W_2}\left(\frac{1}{T'} - \frac{1}{T}\right) + \ln(F(W_2, r_0)) - \ln(F(W_2, r_0')) \quad (4)$$

where T' and $r_0'$ are the temperature and the weld pool size after the time interval, respectively.

If the temperature dependent parts are canceled out, $$W_2 \ln(Y/Y') - W_1 \ln(X/X') = [W_2 \ln(Y) - W_1 \ln(X) + C_3] - [W_2 \ln(Y') - W_1 \ln(X') + C_3] \quad (5)$$

$$= W_2[\ln(F(W_2, r_0)) - \ln(F(W_2, r_0'))] - W_1[\ln(F(W_1, r_0)) - \ln(F(W_1, r_0'))]$$

$$= [W_2 \ln(F(W_2, r_0)) - W_1 \ln(F(W_1, r_0))] - [W_2 \ln(F(W_2, r_0')) - W_1 \ln(F(W_1, r_0'))]$$

$$= S(W_1, W_2, r_0) - S(W_1, W_2, r_0')$$

where $C_3$ is a constant determined by the gain of the detectors and the constants $C_1$ and $C_2$.

The measurable quantity of $[W_2 \ln(Y) - W_1 \ln(X) + C_3]$ can not be compared directly to the calculated value of $S(W_1, W_2, r_0)$, which is a function of the radius of a weld pool and can be calculated on a basis of optical design parameters of the focusing lens or lenses and the aperture, to determine the size of a weld pool due to the unknown constant $C_3$. However, the difference in any two measurable values of $[W_2 \ln(Y) - W_1 \ln(X) + C_3]$ can be directly compared to the difference in the calculated values of $S(W_1, W_2, r_0)$ at the corresponding two weld pool sizes. It means that we have to know the value of $[W_2 \ln(Y) - W_1 \ln(X) + C_3]$ at at least one weld pool size for reference. Then, we can determine the weld pool size to be measured by comparing the difference in the measured value and the known value at the reference of $[W_2 \ln(Y) - W_1 \ln(X) + C_3]$ to the difference in the calculated values of $S(W_1, W_2, r_0)$ to locate the weld pool size to be measured.

If the function $S(W_1, W_2, r_0)$ has a maximum or a minimum at a radius $R_0$, it means that the measured value of $[W_2 \ln(Y) - W_1 \ln(X) + C_3]$ would be maximum or minimum at a weld pool with the same radius $R_0$. If a radius of a weld pool varies in a laser welding and passes the radius of $R_0$ such as in the cooling process between the laser pulses in a pulsed laser welding or at the beginning of a laser welding in a continuous laser welding, the measured signal of $[W_2 \ln(Y) - W_1 \ln(X) + C_3]$ at the weld pool radius of $R_0$ can be used as a reference in the size monitoring of a weld pool.

To be more quantitative, if $S(W_1, W_2, r_0)$ is differentiated with $r_0$, $$d(S(W_1, W_2, r_0))/dr_0 = 2\pi r_0[\{t_2(r_0) \times W_2\}/F(W_2, r_0) - \{t_1(r_0) \times W_1\}/F(W_1, r_0)]. \quad (6)$$

It can be zero and $S(W_1, W_2, r_0)$ can have a maximum or a minimum at a weld pool radius $R_0$ if $$H(R_0) = [t_1(R_0)/F(W_1, R_0)]/[t_2(R_0)/F(W_2, R_0)] \quad (7)$$

$$= W_2/W_1.$$

Figure 3:
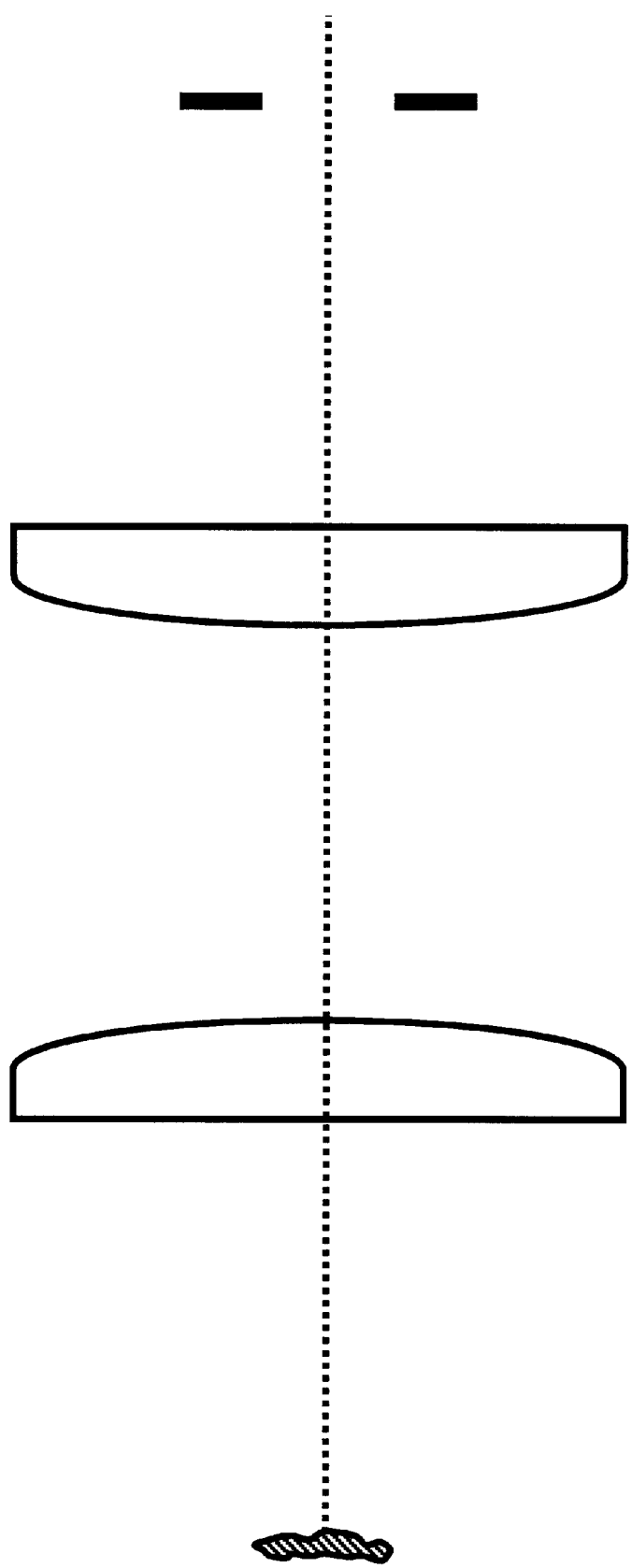
FIG. 3 shows a optical system of two focusing lenses, an aperture and a weld pool used in the explanation of the present invention.
Figure 4:
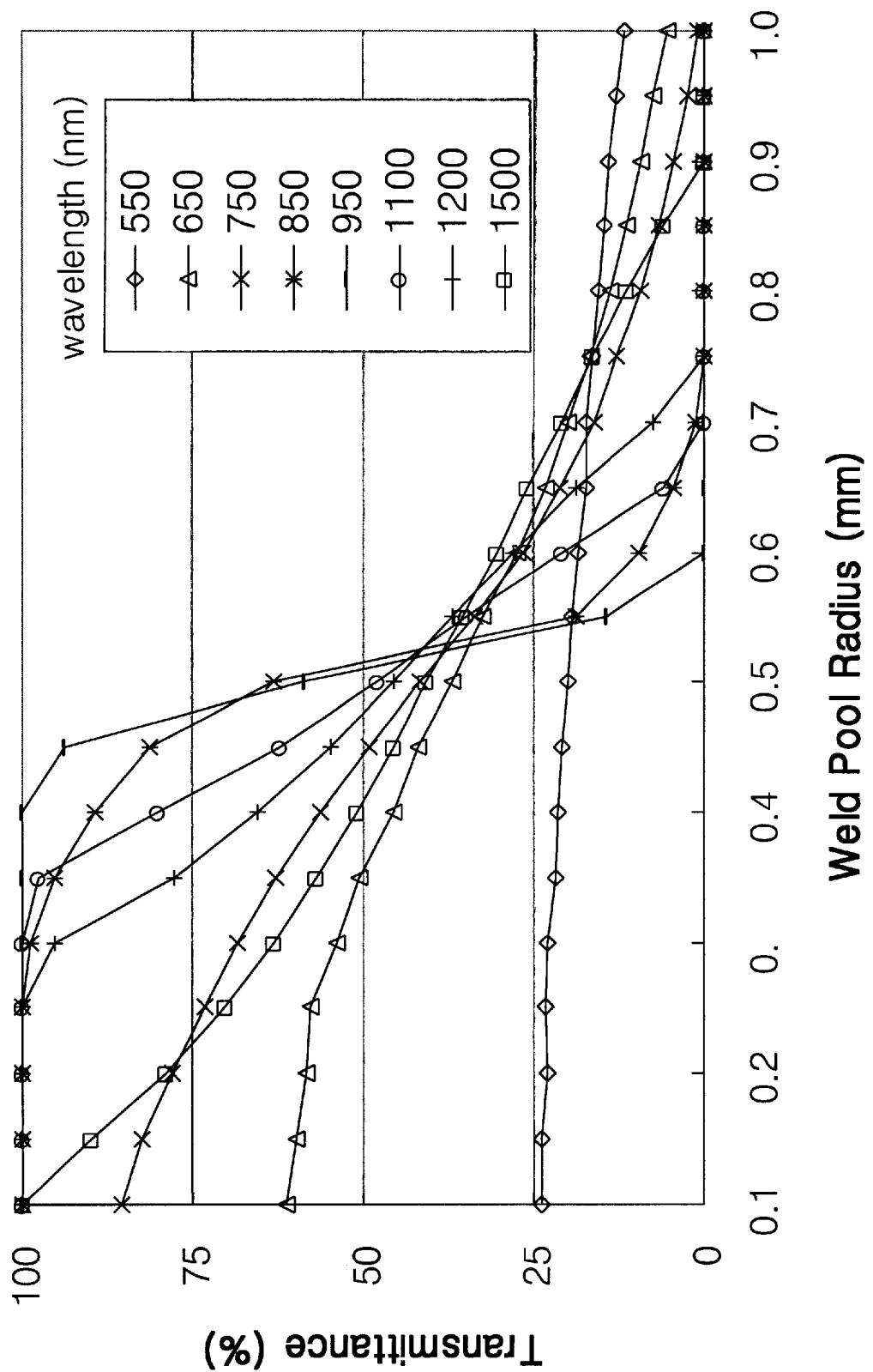
FIG. 4 shows the transmittance function of thermal radiation as a function of weld pool radius at a plurality of wavelengths.
Figure 5:
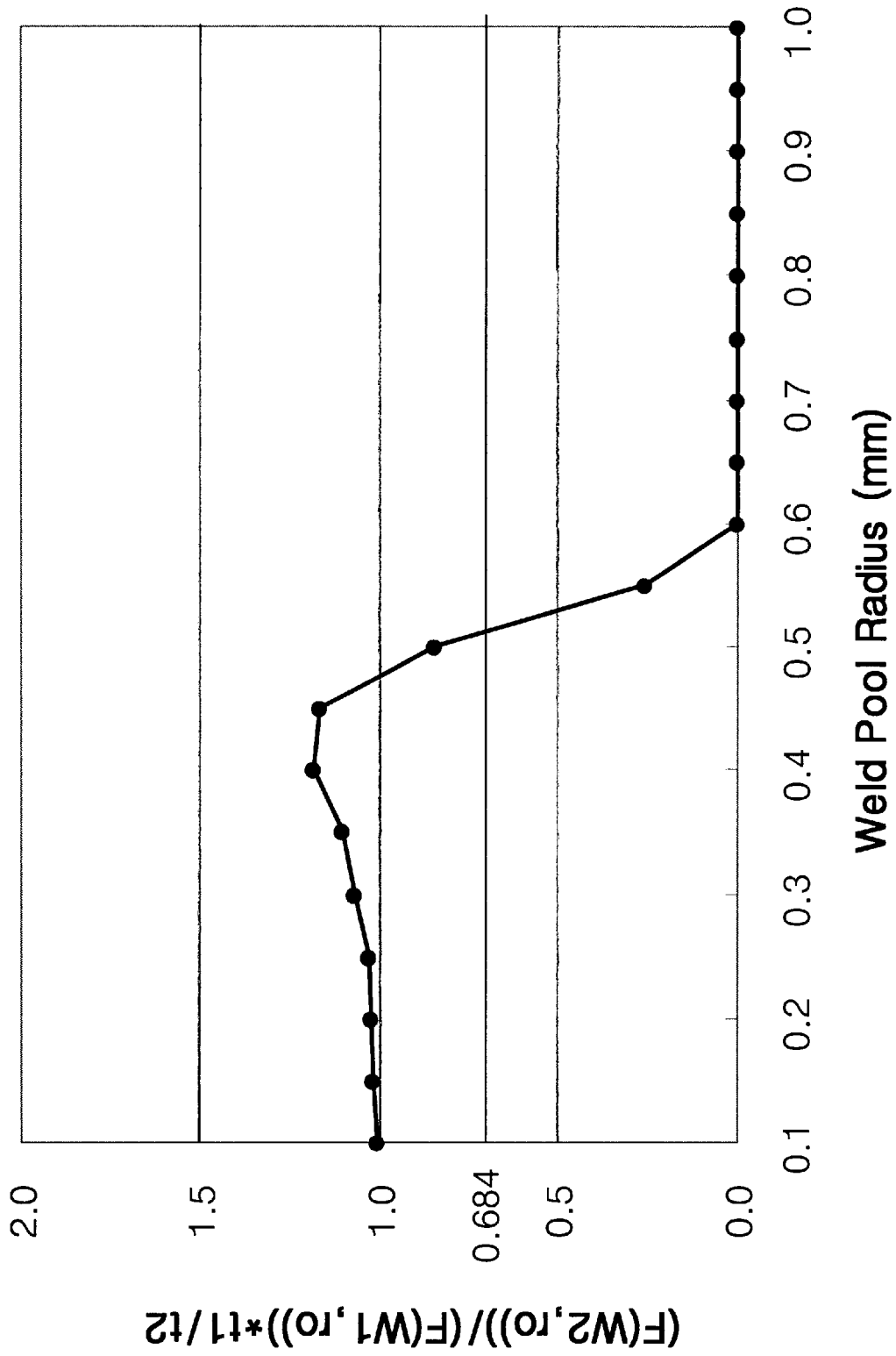
FIG. 5 shows H(r) function for the optical system shown in FIG. 3 wherein $W_1$ is equal to 950 nm and $W_2$ is equal to 650 nm.
Figure 6:
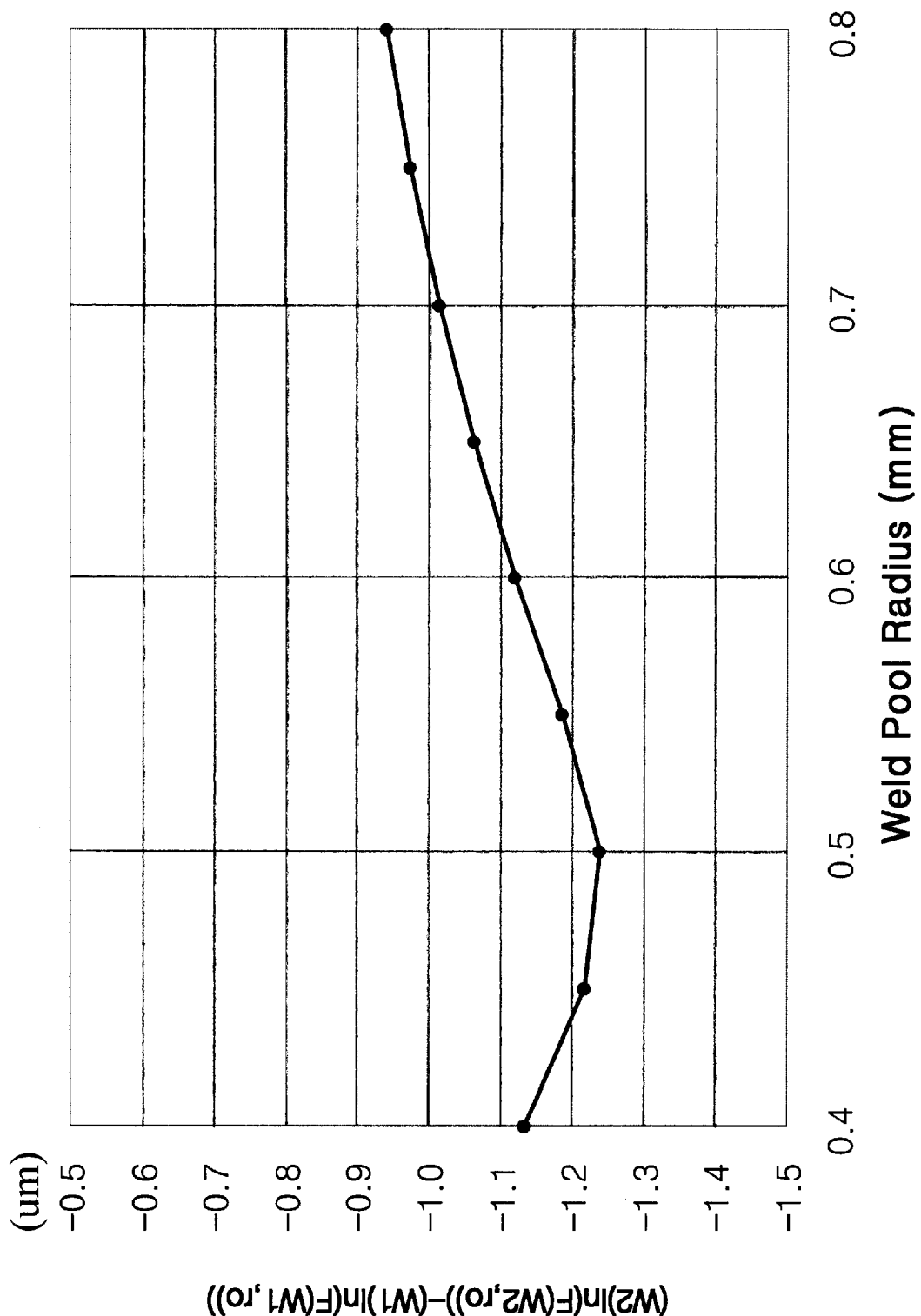
FIG. 6 shows $S(W_1, W_2, r_0)$ function in focus for the optical system shown in FIG. 3 wherein $W_1$ is equal to 950 nm and $W_2$ is equal to 650 nm.
Figure 7:
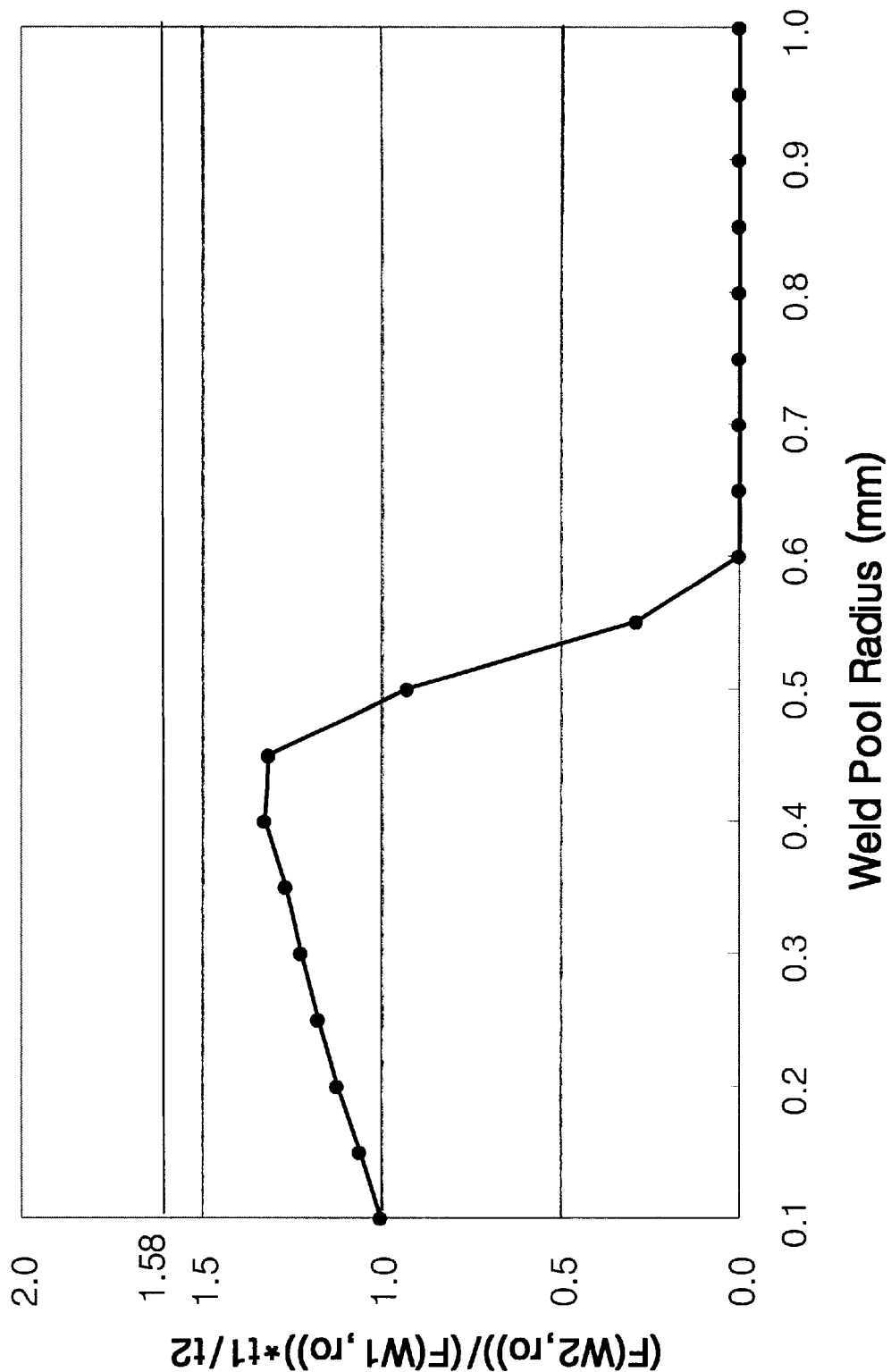
FIG. 7 shows H(r) function for the optical system shown in FIG. 3 wherein $W_1$ is equal to 950 nm and $W_2$ is equal to 1500 nm.
Figure 8:
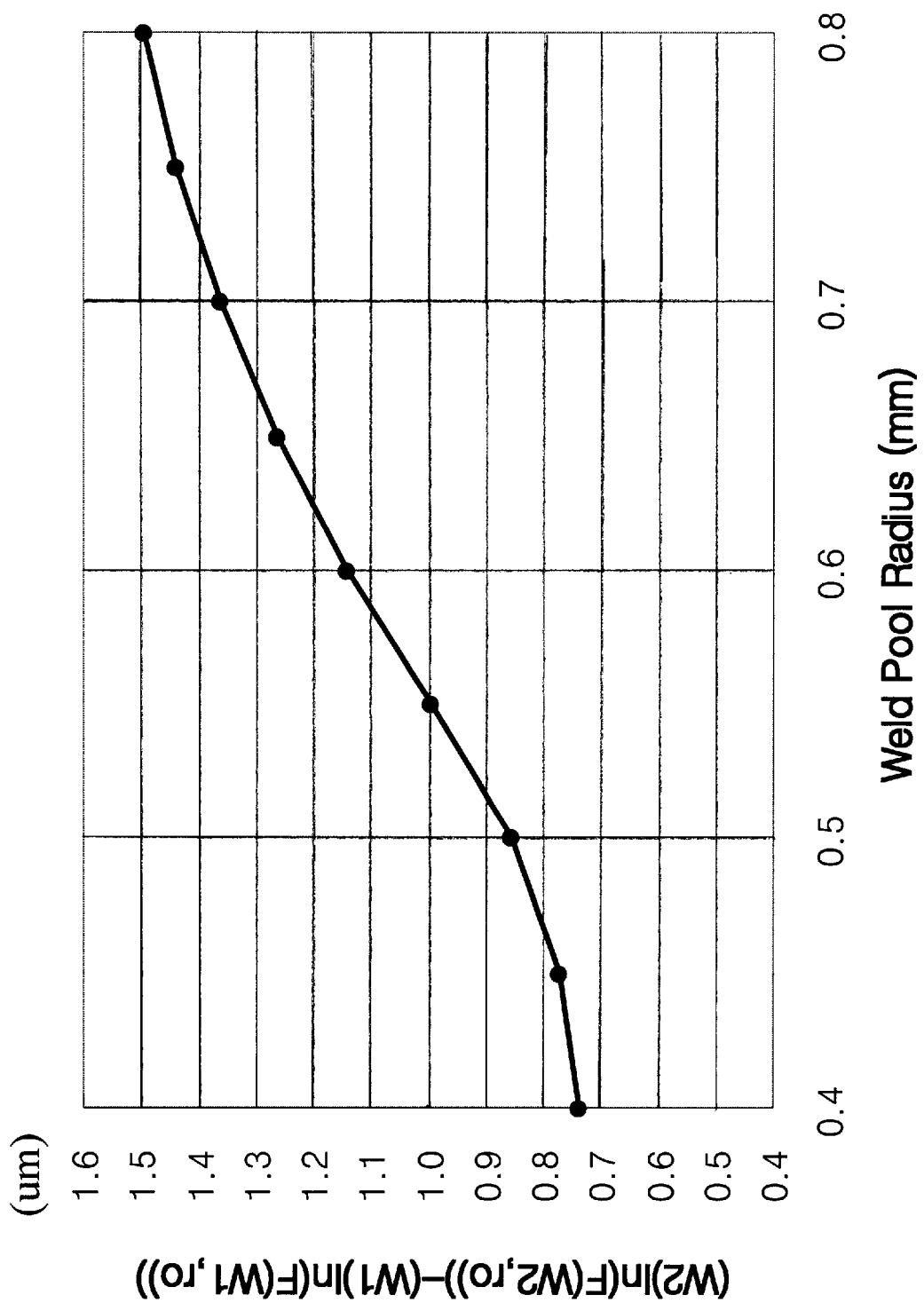
FIG. 8 shows $S(W_1, W_2, r_0)$ function in focus for the optical system shown in FIG. 3 wherein $W_1$ is equal to 950 nm and $W_2$ is equal to 1500 nm.

FIG. 3 shows an optical system used in the following analysis of the chromatic filtering. Two lenses made of high index refraction SF11 glass with F/3.8 and 100 mm focal length, 1 mm aperture size and 1 mm weld pool size is assumed. The plano-convex type of the lenses reduces the spherical aberration near the minimum value. FIG. 4 shows the transmittance function t as a function of a weld pool radius at several wavelengths. The transmittance function t has 100% transmission near the center of a weld pool and reduces to zero as the radius becomes larger. The wavelength $W_1$ is quite near the laser wavelength and $t_1$ becomes zero at a radius near the radius of focused laser spot. On the other hand, the wavelength $W_2$ is quite far from the laser wavelength and $t_2$ becomes zero at a radius much larger than the radius of focused laser spot. The H(r) at r=0 is equal to 1 because the transmittances at both wavelengths is 100% at r=0 and H(r) becomes zero at a radius near the radius of focused laser spot. Therefore, if $W_2 < W_1$, then there is a $R_0$ near the radius of focused laser spot which can satisfies $H(R_0) = W_2/W_1$. FIG. 5 shows H(r) for the optical system shown in FIG. 3 wherein $W_1$ is equal to 950 nm and $W_2$ is equal to 650 nm. It shows the minimum occurs near the radius of focused laser spot when H(r)=650/950=0.684. FIG. 6 shows $S(W_1, W_2, r_0)$ in focus for the optical system shown in FIG. 3 wherein $W_1$ is equal to 950 nm and $W_2$ is equal to 650 nm. The $S(950, 650, r_0)$ has a minimum at the radius $r_0$ satisfying $H(r_0)=0.684$. FIG. 7 shows H(r) for the optical system shown in FIG. 3 wherein $W_1$ is equal to 950 nm and $W_2$ is equal to 1500 nm. It shows that there is no minimum nor maximum because H(r) is always less than 1.58 (1500/950=1.58). FIG. 8 shows $S(W_1, W_2, r_0)$ in focus for the optical system shown in FIG. 3 wherein $W_1$ is equal to 950 nm and $W_2$ is equal to 1500 mn. The $S(950, 1500, r_0)$ increases as the radius of a weld pool increases.

In a pulsed laser welding, the minimum value of $[W_2 \ln(Y) - W_1 \ln(X) + C_3]$ signal can be measured by measuring it repetitively until the weld pool size is reduced down to the size minimizing $S(950, 650, r_0)$. Usually, this occurs in the cooling process between the laser pulses. Then, this minimum value is used in the size monitoring of all other measurements in that one pulse. In a continuous laser welding, a weld pool size is growing at the beginning and becomes larger than the size minimizing $S(950, 650, r_0)$. Therefore, if $[W_2\ln(Y)-W_1\ln(X)+C_3]$ signal is measured repetitively, the minimum value of $[W_2\ln(Y)-W_1\ln(X)+C_3]$ signal can be obtained at the beginning and can be used for the size monitoring of all other measurements.

Figure 9:
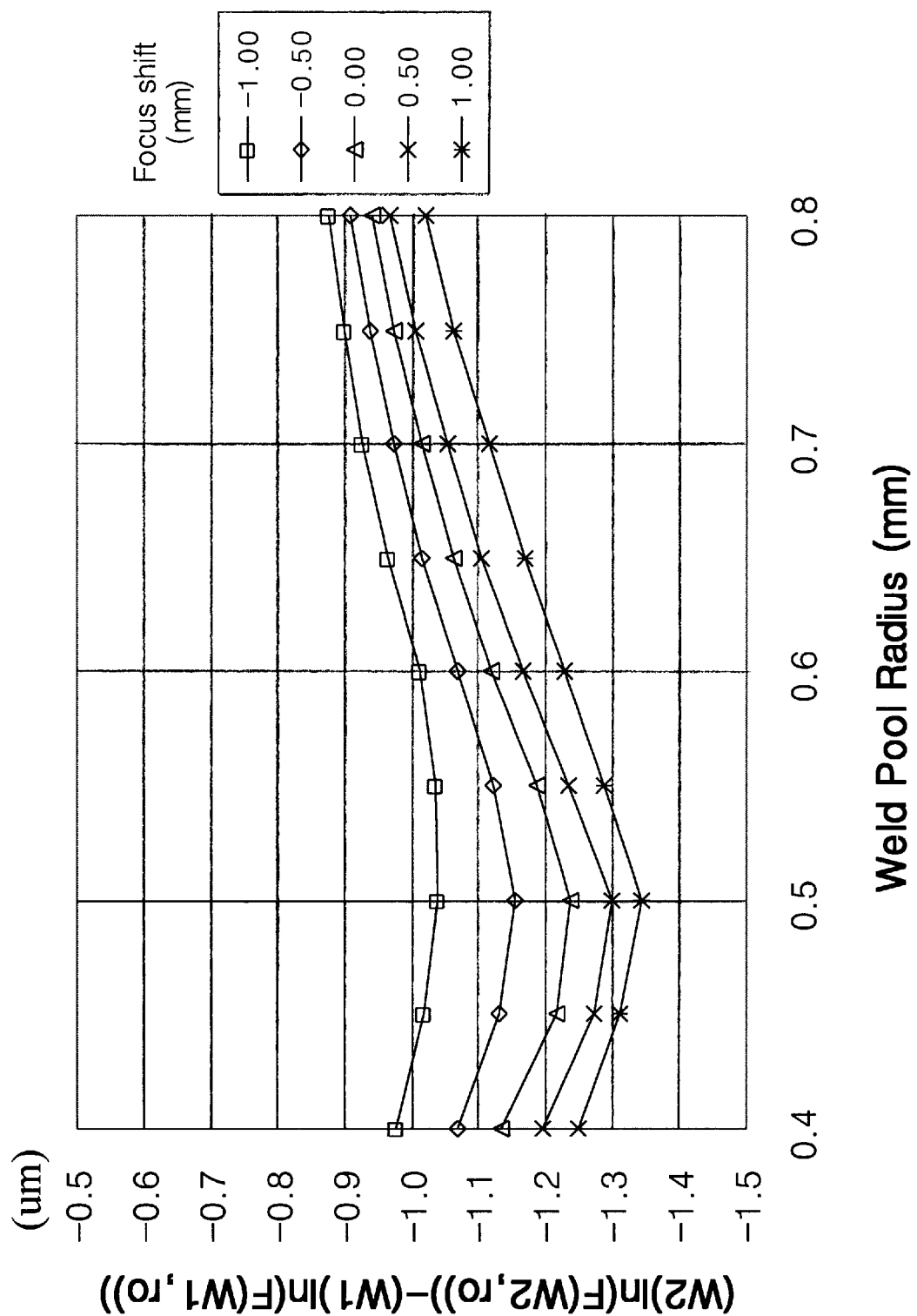
FIG. 9 shows the dependence of $S(950, 650, r_0)$ function on the focus shift of a weld pool.
Figure 10:
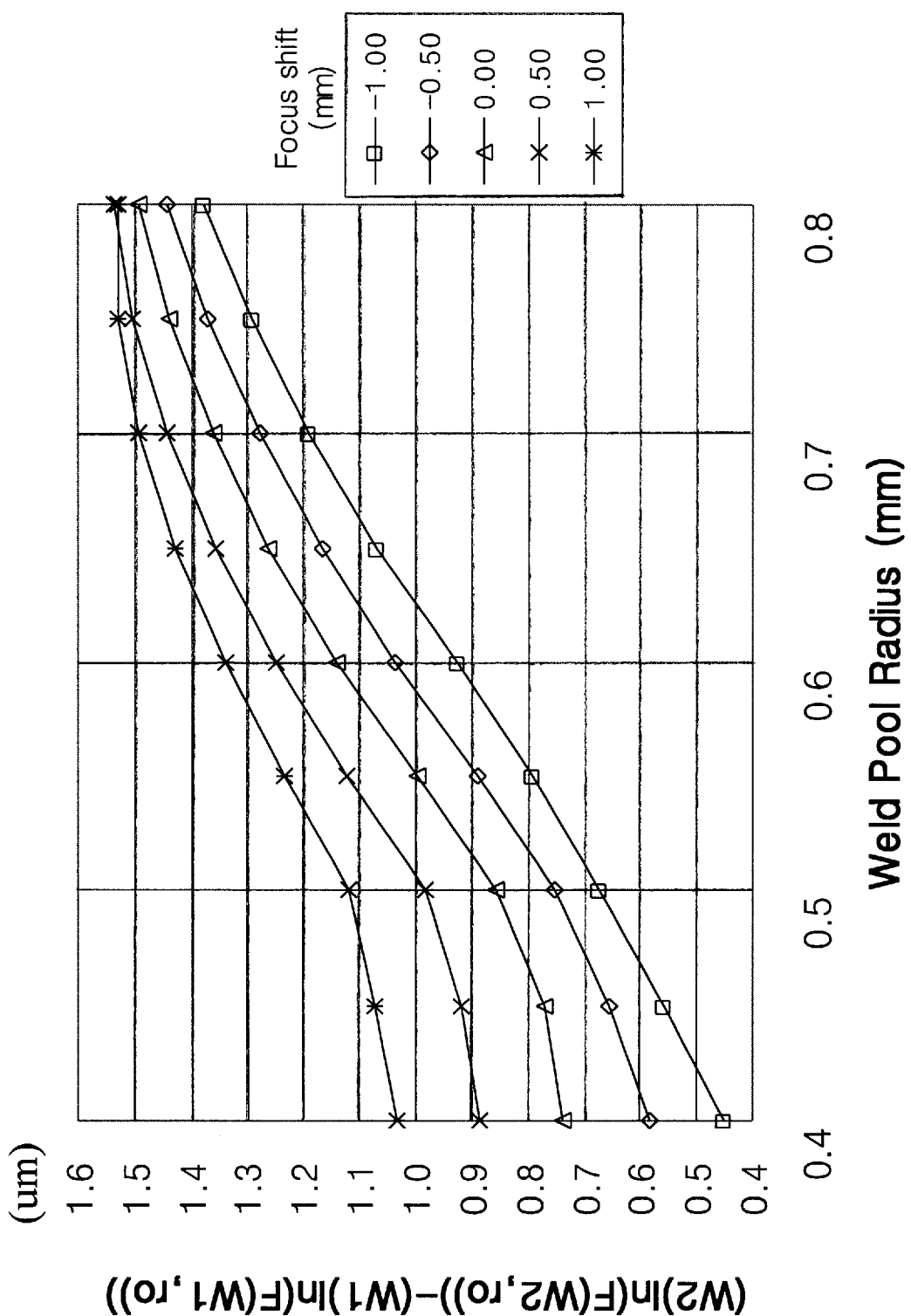
FIG. 10 shows the dependence of $S(950, 1500, r_0)$ function on the focus shift of a weld pool.

Up to now, the effect of focus shift of a weld pool on the size monitoring is not considered. FIG. 9 and FIG. 10 show the dependence of $S(950, 650, r_0)$ and $S(950, 1500, r_0)$ on the focus shift of a weld pool. The curves in FIG. 9 have same shape but shifted by the focus shift. Therefore, in a pulsed laser welding, the same technique can be used in the size monitoring of a weld pool because there is no focus shift introduced between the minimum measurement and the other measurements related to one single pulse even if there will be some focus shift introduced between one pulse and the other pulse measured with time interval. The reference can be measured for each laser pulse in a pulsed laser welding. Therefore, the focus shift does not introduce much error on the size monitoring automatically in a pulsed laser welding.

Figure 11:
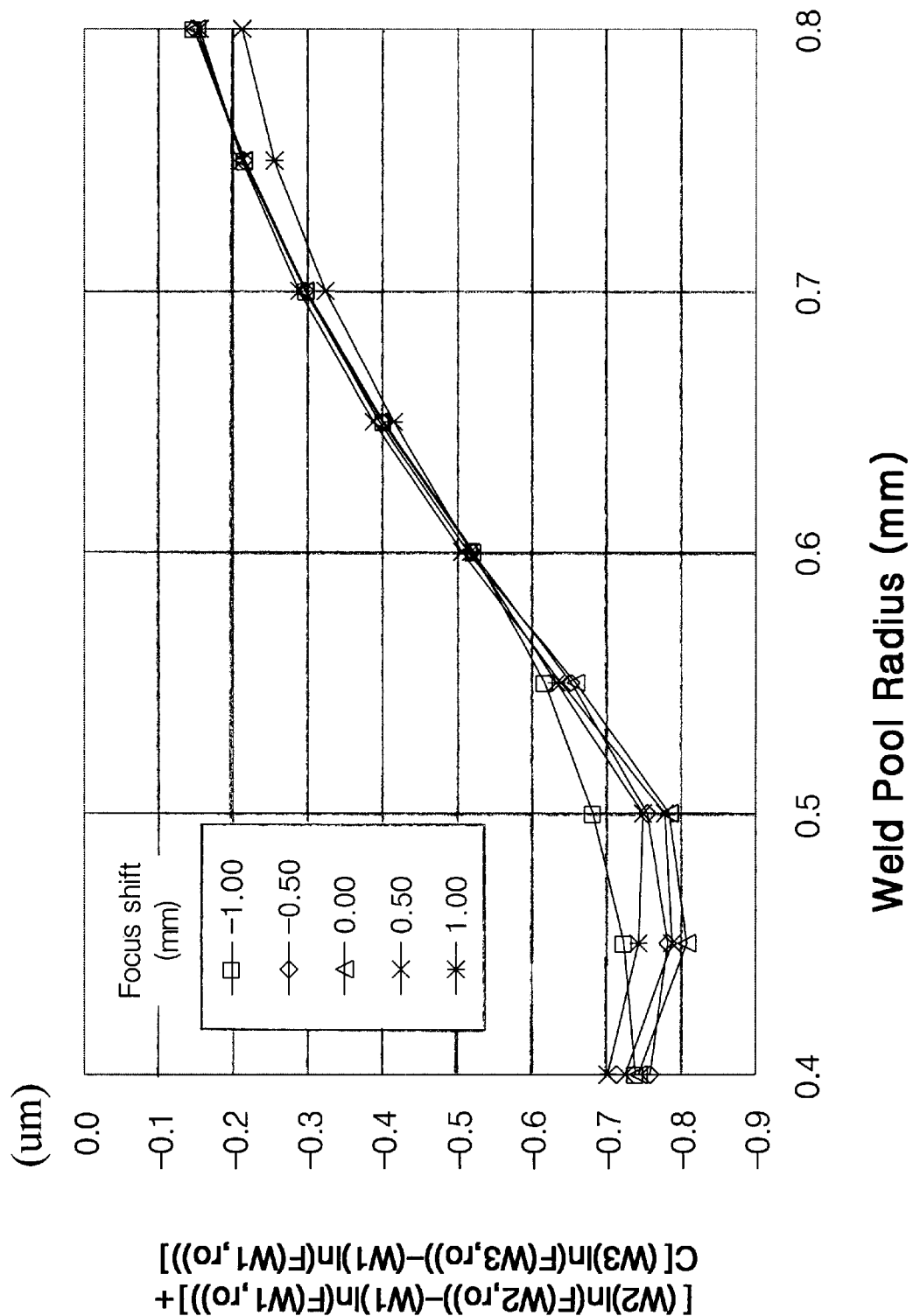
FIG. 11 shows the focus shift dependence of a size variation function wherein $W_1$ is equal to 950 nm, $W_2$ is equal to 650 nm, $W_3$ is equal to 1500 nm and the focus shift compensating constant C is equal to 0.53.

However, in a continuous laser welding, the reference is measured only once at the beginning and the other measurement with some time interval will be affected by the focus shift introduced between the two measurements. Therefore, an algorithm which can compensate the error introduced by a focus shift is needed. The focus shift dependence in FIG. 9 and the focus shift dependence in FIG. 10 show a different sign. One shows a positive dependence and the other shows a negative dependence. However, the sensitivities for the size variation monitoring of FIG. 9 and FIG. 10 have the same sign for a weld pool size near and larger than the focused laser spot size which is the weld pool size of interest used in a conventional laser welding. Therefore, the sum of the $S(950, 650, r_0)$ and the $S(950, 1500, r_0)$ multiplied by a focus shift compensating constant wherein the focus shift compensating constant is determined to compensate the focus shift dependence can be used for monitoring of the size variation of a weld pool. FIG. 11 shows a size variation function which is the sum of the $S(950, 650, r_0)$ and the $S(950, 1500, r_0)$ multiplied by the focus shift compensating constant of 0.53. It shows that the sum of the $S(950, 650, r_0)$ and the $S(950, 1500, r_0)$ multiplied by the focus shift compensating constant of 0.53 can be used in the monitoring of the size variation of a weld pool by comparing it with the measured values of a size variation signal which is $[W_2\ln(Y)-W_1\ln(X)]+0.53\times[W_3\ln(Z)--W_1\ln(X)]$ wherein $W_1$, $W_2$, and $W_3$ are 950 nm, 650 nm and 1500 nm respectively and X,Y,Z are the spectral band signal at 950 nm, 650 nm and 1500 nm respectively. FIG. 1 shows that the size variation of a weld pool can be measured with minimum error induced from a focus shift for a range of weld pool size from the focused laser spot size up to about the 1.5 times of the focused laser spot size which covers the weld pool size of interest in industrial laser welding. It means that the size variation can be monitored independently from the focus shift. The minimum of the size variation function near the focused laser spot size can be used as a reference in the size variation monitoring. Furthermore, the slope of the size variation function at a weld pool size to be maintained can be used to determine the amount of size variation to be compensated with the power control of the laser by using a size error signal wherein the size error signal is obtained by dividing a deviation of a size variation signal from a target value determined by the size of a weld pool to be maintained in a laser welding with the slope of the size variation function at the radius of a weld pool to be maintained.

As to the monitoring of the focus shift of a weld pool, the dependence of spectral band signals on the focus shift of a weld pool can be used. However, the ratio of two spectral band signals is preferred to the difference of two spectral band signals because the ratio does not depend on the intensity variation of the spectral band signals due to the power variation of a laser. Furthermore, if the change in the ratio of two spectral band signals is monitored by division not by subtraction, then the result does not depend on the variations in the gains of single-element detectors. These advantages can be obtained by comparing the natural logarithm of the ratio of two spectral band signals by subtraction.

From Eqs. (1) and (2), a focus shift signal which is the natural logarithm of the ratio of two spectral band signals, X' over Y', can be expressed as $$\ln(X'/Y') = \ln(C_1/C_2) + \frac{14380}{T}\left(\frac{1}{V_2} - \frac{1}{V_1}\right) + [\ln(F(V_1, r_0)) - \ln(F(V_2, r_0))] \tag{8}$$

where $V_1$ and $V_2$ are the wavelengths of the spectral band signals X' and Y'. It is known that the temperature fluctuation induced by a laser power variation is small in a laser welding, but a laser power variation induces a size variation of a weld pool in a laser welding. Therefore, the weld pool size dependence of a focus shift function of $\ln(F(V_1, r_0))-\ln(F(V_2, r_0))$ in the third term in Eq. (8) has to be minimized. Then, the focus shift dependence of the third term in Eq. (8) can be used for the monitoring of the focus shift of a weld pool independently from the size variation of a weld pool. It means that the differentiation of $[\ln(F(V_1, r_0))-\ln(F(V_2, r_0))]$ with $r_0$ should be zero at the weld pool radius of interest.

$$d(\ln(F(V_1, r_0))-\ln(F(V_2, r_0)))/dr_0 = 2\pi r_0[t_1(r_0)/F(V_1, r_0)-t_2(r_0)/F(V_2, r_0)] \tag{9}$$

Figure 12:
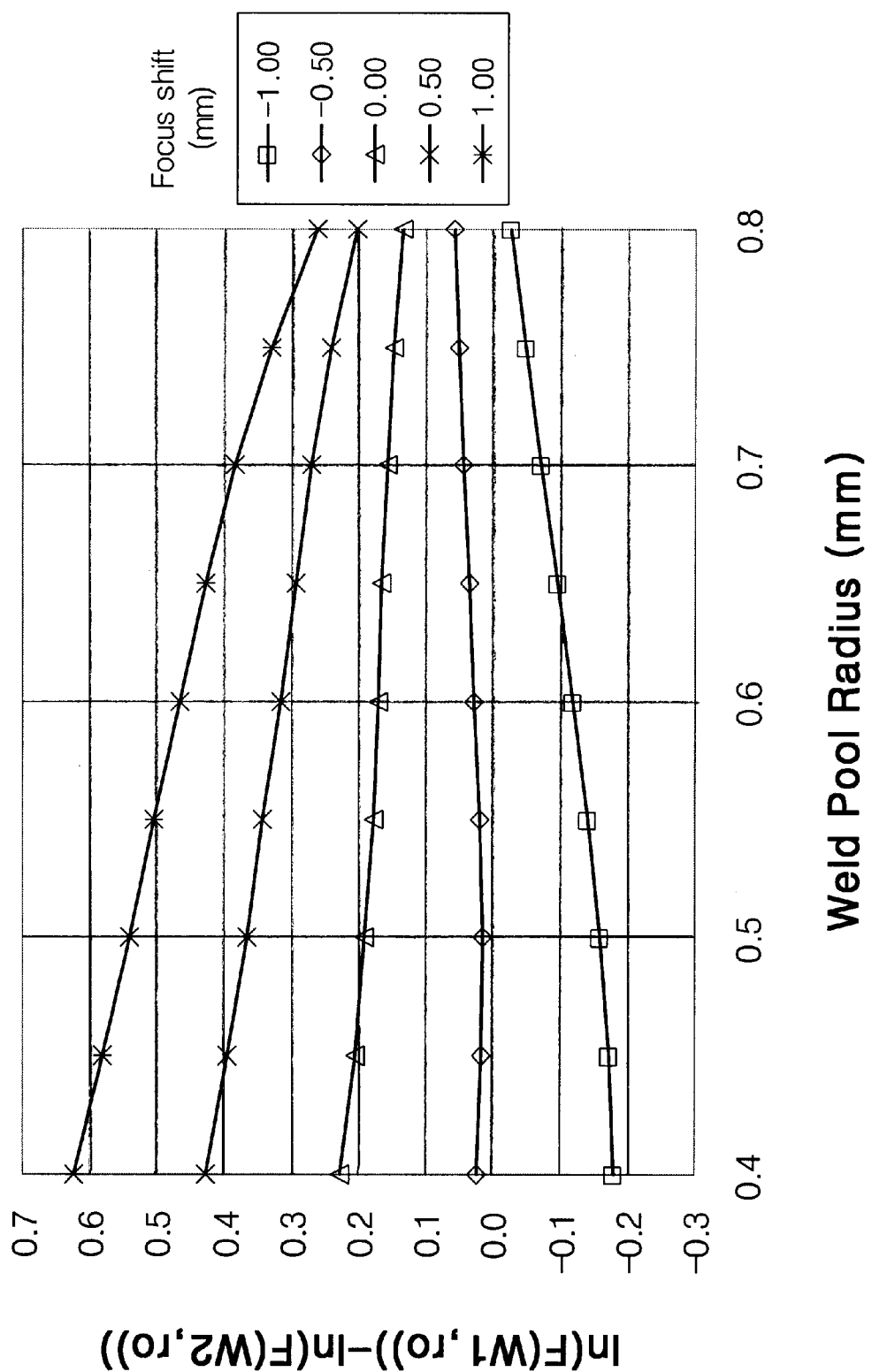
FIG. 12 shows the focus shift dependence of a focus shift function wherein $V_1$ is equal to 1500 nm and $V_2$ is equal to 650 nm.

The $d(\ln(F(V_1, r_0))-\ln(F(V_2, r_0)))/dr_0$ in Eq. (9) can be zero if the shape of $t_1(r_0)$ is as same as the shape of $t_2(r_0)$. In other words, we have to choose the two wavelengths of the spectral bands so that the transmittances of the spectral bands at two wavelengths should be as same as possible. This condition can be satisfied by selecting one wavelength in the shorter wavelength and the other wavelength in the longer wavelength than the laser wavelength. Furthermore, the wavelengths should be far enough from the laser wavelength to introduce large chromatic aberration. For an optical system shown in FIG. 3, the transmittances at 650 nm and 1500 nm are nearly the same as shown in FIG. 4. FIG. 12 shows the focus shift dependence of $\ln(F(V_1, r_0))-\ln(F(V_2, r_0))$ for a plurality of focus shifts wherein $W_1$ is 1500 nm and $W_2$ is 650 nm. It shows that the monitoring of the focus shift of a weld pool is not affected by the size variation induced by laser power variation for a weld pool size range from the focused laser spot size of 1 mm up to the 1.5 times the focused laser spot size which covers the size variation of interest occurred in industrial applications. The sensitivity of a focus shift signal is obtained by dividing the difference between the value of the focus shift function at a focus shifted position and the value of the focus shift function in focus position with the amount of the focus shift introduced at the weld pool radius of interest. As shown in FIG. 12, the sensitivity of a focus shift signal which is the same as the focus shift sensitivity of the focus shift function of $\ln(F(V_1,$ $r_0))-\ln(F(V_2, r_0))$ for the optical system shown in FIG. 3 is higher than 0.2 per mm focus shift for a weld pool size range of from the focused laser spot size of 1 mm up to the 1.5 times the focused laser spot size. This sensitivity of a focus shift signal is used in determining a focus error signal for the focus control of a weld pool wherein the focus error signal is obtained by dividing a deviation in a focus shift signal from the focus shift signal value measured when a weld pool is in focus position with this sensitivity of a focus shift signal at the radius of a weld pool.

For a laser welding with two focusing lenses and an aperture of 1.0 mm as shown in FIG. 3, a weld pool size of 1.3 mm with a high power Nd:YAG laser of 1.0 mm focused spot size is considered. As shown in FIG. 11, the minimum detectable size variation with the size variation function in focus which has a size variation sensitivity of about 1 um per 1 mm size variation is less than 0.04 mm for a noise level of or less than ±0.02 (um) in a size variation signal which can be easily obtained for detector circuits with the digitization with 12 bits accuracy and with the signal to noise ratio of higher than a couple of hundreds. For the monitoring of focus shift of a weld pool, the minimum detectable focus shift with the focus shift function in focus which has a focus shift sensitivity higher than 0.2 per mm focus shift is less than 0.2 mm for a noise level of or less than ±0.02 in a focus shift signal which can be easily obtained for detector circuits with the digitization with 12 bits accuracy and with the signal to noise ratio of higher than a couple of hundreds. The temperature dependence of a focus shift signal in Eq. (8) shows that the induced error in a focus shift signal for a temperature variation of 50° K. at a weld pool temperature of 2000° K. is about 0.15 and introduces a focus shift error of about 0.75 mm. It is known that the temperature variation of a weld pool for a size variation up to ±0.1 mm is generally less than 50° K. in a laser welding. In a laser welding with 1.3 mm weld pool size, a weld pool size variation of ±0.1 mm can be allowed and the accompanying depth variation is small enough to maintain a uniform weld depth. Therefore, the effective minimum detectable focus shift including the induced error from a temperature variation is less than ±0.5 mm for an allowable weld pool size variation of ±0.1 mm.

For a laser welding with two focusing lenses and an aperture of 1.0 mm as shown in FIG. 3, the allowable focus shift is larger than ±1.0 mm because the focal length is 100 mm and the focus shift is only 1% of the focal length. Therefore, an allowable focus control range of ±1.0 mm is considered. As shown in FIG. 11, the maximum induced error of the size monitoring is about or less than ±0.05 mm at the maximum focus shift of the allowable focus control range of ±1.0 mm. Therefore, the sum of the minimum detectable size variation and the maximum induced error of the size monitoring at the maximum focus shift of the allowable focus control range of ±1.0 mm is less than ±0.1 mm and the monitoring of size variation of a weld pool within ±0.1 mm is obtained independently from the focus shift of a weld pool within the allowable focus control range of ±1.0 mm. On the other hand, the maximum induced error on the monitoring of focus shift within a weld pool size variation of ±0.1 mm is about or less than 0.5 mm. Therefore, the sum of the effective minimum detectable focus shift of ±0.5 mm and the maximum induced error on the monitoring of focus shift within a weld pool size variation of ±0.1 mm is about or less than ±1.0 mm and the monitoring of focus shift of a weld pool within ±1.0 mm is obtained independently from the size variation of a weld pool of 1.3±0.1 mm. In conclusion, the simultaneous monitoring of size variation and focus shift is obtained wherein the size variation of a weld pool can be monitored independently from the focus shift and vice versa.

Although the present invention has been described in considerable detail with reference to certain preferred versions thereof, many modifications and changes will occur to those skilled in the art. It is, therefore, understood that the appended claims are intended to cover all such modifications and chances which fall within the spirit and scope of the invention.

What is claimed is:

1. A method for monitoring the size variation and the focus shift of a weld pool simultaneously or either the size variation or the focus shift of a weld pool in a laser welding, the method comprising the steps of:

transmitting a laser beam through an aperture which limits a size of a laser beam;

focusing transmitted laser beam with at least one lens with some chromatic aberration but minimum spherical aberration on a workpiece;

measuring a thermal radiation from a weld pool through the at least one lens, and through the aperture or any other aperture limiting a size of a weld pool wherein the thermal radiation is measured;

separating the thermal radiation and the laser beam reflected from the workpiece with a dichromatic mirror;

splitting the thermal radiation with dichromatic beam splitters into at least three spectral bands;

filtering each spectral band of the thermal radiation with a narrow band-pass optical filter;

detecting each narrow band-pass filtered thermal radiation with a single-element detector as a electrical signal;

sampling electrical signals as detector signals from the single-element detectors digitally;

processing a plurality of digitized detector signals as processed signals so that the processed signals generator a digital signal, a size variation signal, and/or another digital signal, a focus shift signal; and generating, from the size variation signal and the focus shift signal, a size error signal representative of the size variation of a weld pool and/or a focus error signal representative of the focus shift of a weld pool from the image plane of the aperture formed by the at least one lens at the wavelength of the laser beam.

2. The method of claim 1, wherein filtering with a narrow band-pass filter includes at least three narrow band-pass filters.

3. The method of claim 2, wherein a center wavelength of the first narrow bans-pass filter is close to the wavelength of the laser beam preferably within about one tenth and up to about two tenths of the wavelength of the laser beam, a center wavelength of the second narrow band-pass filter is far from the wavelength of the laser beam toward a shorter wavelength and a center wavelength of the third narrow band-pass filter is chosen in a wavelength longer than the wavelength of the laser beam so that a transmittance function of thermal radiation from a weld pool through the aperture at the center wavelength of the third narrow band-pass filter is as same as the transmittance function of thermal radiation from a weld pool through the aperture at the center wavelength of the second narrow band-pass filter.

4. The method of claim 1, wherein sampling electrical signals from the single-element detectors comprises:

digitizing electrical signals from the single-element detectors digitally with a resolution of between 8 bits and 16 bits, but preferably 12 to 16 bits; and digitizing electrical signals repetitively while adjusting a interval between consecutive samplings.

5. The method of claim 1, wherein processing a plurality of digitized detector signals comprises the steps of:

calculating a natural logarithm of digitized data of each spectral band;

calculating a wavelength weighted spectral band signal which is a multiplication of the natural logarithm of digitized data of each spectral band and the wavelength of each spectral band;

calculating a size determining term 1 which is the wavelength weighted spectral band signal at the shortest wavelength minus the wavelength weighted spectral band signal at the middle wavelength;

calculating a size determining term 2 which is the wavelength weighted spectral band signal at the longest wavelength minus the wavelength weighted spectral band signal at the middle wavelength; and calculating a size variation signal which is a sum of the size determining term 1 plus a multiplication of the size determining term 2 and a focus shift compensating constant.

6. The method of claim 5, wherein determining a focus shift compensating constant comprises the steps of:

calculating a transmittance of a thermal radiation on a weld pool through at least one lens focusing a laser beam and through an aperture limiting a size of the laser beam as a function of position on the weld pool at each spectral band on a basis of optical design parameters of the at least one lens and the aperture for a plurality of focus shifted positions of the weld pool;

calculating a integrated transmittance function as a function of a radius R so that a value of the integrated transmittance function is an integration of the transmittance of a thermal radiation through the aperture over a weld pool circle with the radius R at each spectral band for a plurality of focus shifted positions of the weld pool;

calculating a natural logarithm of the integrated transmittance function as a function of a radius R at each spectral band for a plurality of focus shifted positions of the weld pool;

calculating a spectral size determining function by multiplying the natural logarithm of the integrated transmittance function as a function of a radius R at each spectral band for a plurality of focus shifted positions of the weld pool with the wavelength of the spectral band;

calculating a size determining function 1 by subtracting the spectral size determining function at the middle wavelength from the spectral size determining function at the shortest wavelength for a plurality of focus shifted positions of the weld pool;

calculating a size determining function 2 by subtracting the spectral size determining function at the middle wavelength from the spectral size determining function at the longest wavelength for a plurality of focus shifted positions of the weld pool;

selecting a focus shift compensating constant which shows the minimum focus shift dependence in a size variation function, which is a sum of the size determining function 1 plus a multiplication of the size determining function 2 and the focus shift compensating constant, for a plurality of focus shifted positions of the weld pool in a range of radius wherein a weld pool radius of interest is located within the range of radius; and calculating a size variation function which is a sum of the size determining function 1 plus a multiplication of the size determining function 2 and the focus shift compensating constant for a plurality of focus shifted positions of the weld pool.

7. The method of claim 6, wherein the minimum or the maximum of the size variation function is used as a reference to determine the size of a weld pool.

8. The method of claim 6, wherein a size error signal is obtained by dividing a deviation of a size variation signal from a target value determined by the size of a weld pool to be maintained in a laser welding with the slope of the size variation function at the radius which is a half of the size of a weld pool to be maintained.

9. The method of claim 1, wherein processing a plurality of digitized detector signals further comprises the steps of:

calculating a natural logarithm of digitized data of each spectral band; and calculating a focus shift signal which is the natural logarithm of digitized data of the spectral band at the longest wavelength minus the natural logarithm of digitized data of the spectral band at the shortest wavelength.

10. The method of claim 9, wherein determining a sensitivity of a focus shift signal comprises the steps of:

calculating a transmittance of a thermal radiation on a weld pool through at least one lens focusing a laser beam and through an aperture limiting a size of the laser beam as a function of position on the weld pool on a basis of optical design parameters of the at least one lens and the aperture at the shortest wavelength and at the longest wavelength for a plurality of focus shifted positions of the weld pool;

calculating a integrated transmittance function as a function of a radius R so that a value of the integrated transmittance function is an integration of the transmittance of a thermal radiation through the aperture over a weld pool circle with the radius R at the shortest wavelength and at the longest wavelength for a plurality of focus shifted positions of the weld pool;

calculating a natural logarithm of the integrated transmittance function as a function of a radius R at the shortest wavelength and at the longest wavelength for a plurality of focus shifted positions of the weld pool;

calculating a focus shift function which is the natural logarithm of the integrated transmittance function as a function of a radius R at the longest wavelength minus the natural logarithm of the integrated transmittance function as a function of a radius R at the shortest wavelength; and calculating a sensitivity of a focus shift signal which is the difference between the value of the focus shift function at a focus shifted position and the value of the focus shift function in focus position divided by the amount of the focus shift introduced as a function of radius R.

11. The method of claim 10, wherein a focus error signal is obtained by dividing a deviation in a focus shift signal from the focus shift signal value measured when a weld pool is in focus position with the sensitivity of a focus shift signal at the radius which is a half of the size of a weld pool.

12. The method of claim 1 further including a method for controlling the power of a laser using the size error signal and a method for controlling the focus position of the at least one lens using the focus error signal.

13. Apparatus for monitoring the size variation and the focus shift of a weld pool simultaneously or either the size variation or the focus shift of a weld pool in a laser welding comprising means for transmitting a laser beam through an aperture which limits a size of a laser beam;

means for focusing transmitted laser beam with at least one lens with some chromatic aberration but minimum spherical aberration on a workpiece;

means for measuring a thermal radiation from a weld pool through the at least one lens, and through the aperture or any other aperture limiting a size of a weld pool wherein the thermal radiation is measured;

means for separating the thermal radiation and the laser beam reflected from the workpiece with a dichromatic mirror;

means for splitting the thermal radiation with dichromatic beam splitters into at least three spectral bands;

means for filtering each spectral band of the thermal radiation with a narrow band-pass optical filter;

means for detecting each narrow band-pass filtered thermal radiation with a single-element detector as a electrical signal;

means for sampling electrical signals as detector signals from the single-element detectors digitally;

means for processing a plurality of digitized detector signals as processed signals so that the processed signals generator a digital signal, a size variation signal, and/or another digital signal, a focus shift signal; and means for generating, from the size variation signal and the focus shift signal, a size error signal representative of the size variation of a weld pool and/or a focus error signal representative of the focus shift of a weld pool from the image plane of the aperture formed by the at least one lens at the wavelength of the laser beam.

14. The apparatus of claim 13, wherein a distal end of an optical fiber is used as the aperture for a laser beam deliverable through an optical fiber.

15. The apparatus of claim 13, wherein means for focusing transmitted laser beam with at least one lens includes at least one lens made of high index of refraction glass.

16. The apparatus of claim 13, wherein the dichromatic mirror reflecting the laser beam and transmitting the thermal radiation, or the dichromatic mirror reflecting the thermal radiation and transmitting the laser beam is used to separate the thermal radiation and the laser beam.

17. The apparatus of claim 13, wherein beam splitters reflecting one spectral band and transmitting the other spectral band or bands are used to split the spectral bands.

18. The apparatus of claim 13, wherein a bandwidth of the narrow band-pass optical filters is preferably about one hundredth and up to about one tenth of the wavelength of the laser beam.

19. The apparatus of claim 13, wherein means for filtering with a narrow band-pass filter includes at least three narrow band-pass filters.

20. The apparatus of claim 19, wherein a center wavelength of the first narrow bans-pass filter is close to the wavelength of the laser beam preferably within about one tenth and up to about two tenths of the wavelength of the laser beam, a center wavelength of the second narrow band-pass filter is far from the wavelength of the laser beam toward a shorter wavelength and a center wavelength of the third narrow band-pass filter is chosen in a wavelength longer than the wavelength of the laser beam so that a transmittance function of thermal radiation from a weld pool through the aperture at the center wavelength of the third narrow band-pass filter is as same as the transmittance function of thermal radiation from a weld pool through the aperture at the center wavelength of the second narrow band-pass filter.

21. The apparatus of claim 13, wherein at least three single-element detectors are used in detecting the narrow band-pass filtered spectral bands.

22. The apparatus of claim 21, wherein a silicon photodiode or silicon photodiodes are used for detecting spectral band or bands of wavelength in the visible or in the near infrared up to 1000 nm and an InGaAs photodiode or InGaAs photodiodes are used for detecting spectral band or bands of wavelength range from 1000 nm to 1700 nm.

23. The apparatus of claim 13, wherein means for sampling the electrical signals from the single-element detectors comprises:

means for digitizing the electrical signals from the single-element detectors digitally with a resolution of between 8 bits and 16 bits, but preferably 12 to 16 bits; and means for digitizing electrical signals repetitively while adjusting a interval between consecutive samplings.

24. The apparatus of claim 13 further including:

means for displaying the size error signal;

means for displaying the focus error signal;

means for adjusting a power of a laser if the size error signal deviates from the predetermined allowable range; and means for adjusting the position of the at least one lens if the focus error signal deviates from the predetermined allowable range.

\* \* \* \* \*

UNITED STATES PATENT AND TRADEMARK OFFICE
CERTIFICATE OF CORRECTION

PATENT NO. : 6,344,625 B1
DATED : February 5, 2002
INVENTOR(S) : Cheol-Jung Kim et al.

It is certified that error appears in the above-identified patent and that said Letters Patent is hereby corrected as shown below:

Column 14,
Lines 37-38, correct claim 1 as follows: "processed signals generator" should be
-- processed signals generate --

Signed and Sealed this

Eighth Day of October, 2002

Attest:

Attesting Officer

JAMES E. ROGAN
Director of the United States Patent and Trademark Office